April 8, 1969 Q. BERG 3,437,460

LEAD WIRE ASSEMBLY

Filed May 12, 1966

INVENTOR.
QUENTIN BERG

BY Whittemore,
Hulbert & Belknap

ATTORNEYS

United States Patent Office 3,437,460

Patented Apr. 8, 1969

3,437,460

LEAD WIRE ASSEMBLY

Quentin Berg, % Berg Electronics, Inc., New Cumberland, Pa. 17070

Filed May 12, 1966, Ser. No. 549,728
Int. Cl. B65h *54/00*
U.S. Cl. 29—193.5 6 Claims

ABSTRACT OF THE DISCLOSURE

A continuous lead wire assembly having a plurality of parallel insulated lead wires arranged in a number of like wire groups, each of the groups being made up of a number of lead wires having different lengths and arranged in a predetermined sequence. The wires are held in position by a carrier strip which extends the length of the assembly.

This invention relates to a continuous lead wire assembly and has particular reference to an assembly of like groups of parallel lead wires carried by a strip type support. Each of the wire groups is made up of a number of lead wires of selected lengths arranged in a predetermined sequence. The assembly is useful in wiring electrical circuits.

In the electronics industry it is often necessary to secure a number of lead or jumper wires of different lengths or gauges to a circuit element. Conventionally these lead wires are manually secured to the circuit elements. Each type of jumper wire is manufactured as a loose part and is placed in a bin adjacent the work area. The technician selects the appropriate lead and manually inserts or attaches it to the circuit element at the appropriate location. This conventional method of attaching lead wires to circuit elements is slow and expensive in terms of labor costs.

The invention provides an assembly of groups of parallel lead wires, each group comprising an ordered arrangement of the various lead wires required to wire one circuit element. The invention is useful with an applicating machine whereby one group of lead wires is indexed into the machine at a time and is then broken away from the assembly carrier. The individual lead wires are then automatically secured to the circuit element. Thus by the use of an assembly of pre-indexed lead wires it is possible to automate the process of attaching lead wires to circuit elements thereby eliminating substantial labor costs and improving the reliability of the connection between the individual lead wires and the circuit elements.

Accordingly, it is an object of the invention to provide a novel lead wire assembly.

Another object of the invention is to provide a lead wire assembly comprising a number of like groups of lead wires arranged in a predetermined sequence.

Other objects and features of the invention will become apparent as the description proceeds, especially when taken in conjunction with the accompanying drawings illustrating a preferred embodiment of the invention, wherein.

Figures 1, 2, 3:
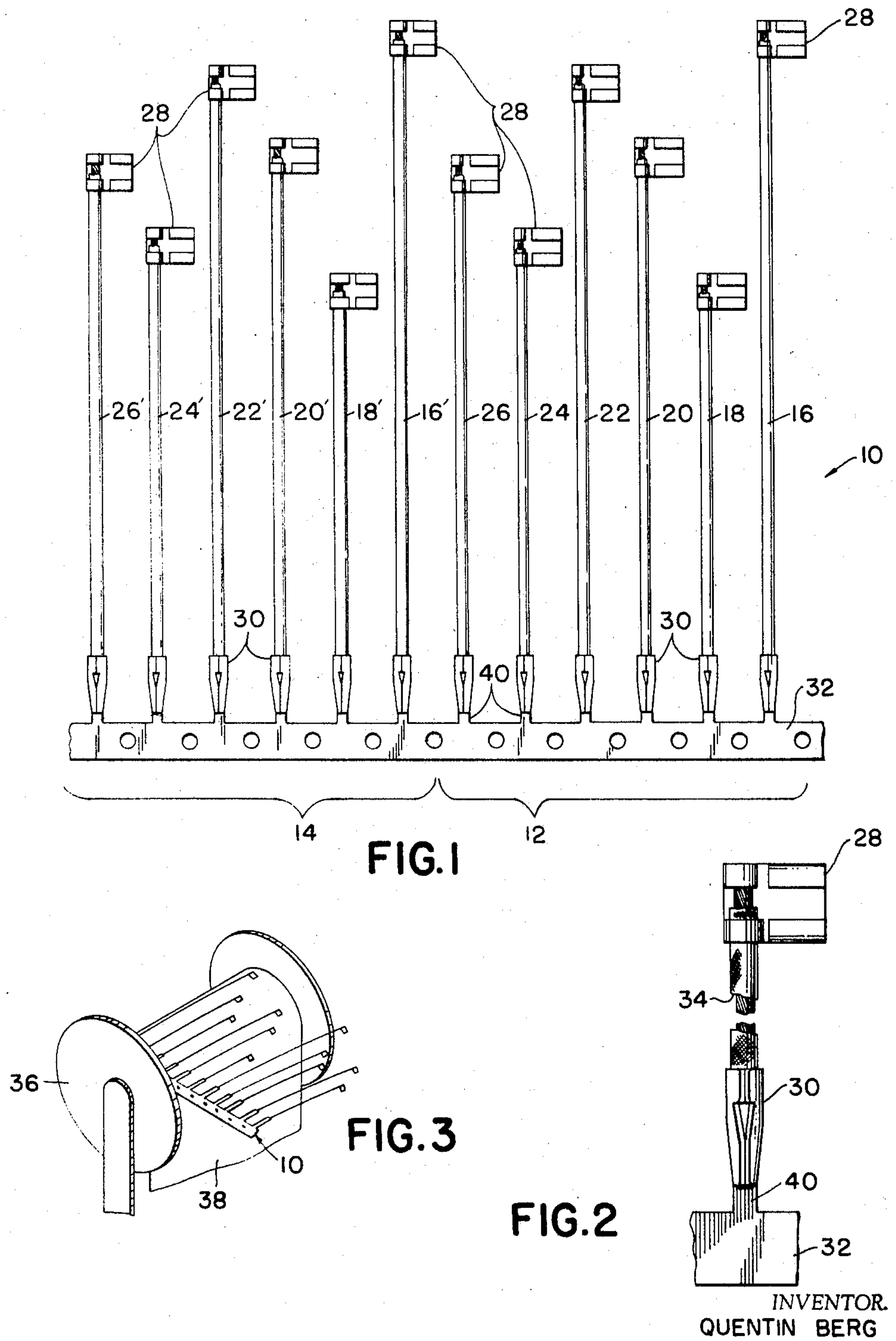
FIGURE 1 shows a portion of a lead wire assembly according to the invention, showing two groups of lead wires.
FIGURE 2 is an enlarged view of one of the lead wires shown in FIGURE 1.
FIGURE 3 shows a reel useful for storage of an assembly according to the invention.

As shown in the drawings, a continuous lead wire assembly 10 is made up of a series of like groups 12, 14, etc. of parallel lead wires 16, 18, 20, 22, 24, and 26; 16', 18', 20', 22', 24', and 26' etc. In the drawings the lead wire groups 12, 14 contain six lead wires; however, it is obvious that each group may contain as many lead wires as are required to wire one circuit element.

Each of the lead wires 16–26 may be provided with a connector terminal 28 at one end thereof. In the drawings the terminal 28 is a flag-type disconnect terminal but it is clear that any suitable terminal may be utilized. A terminal 30 on carrier strip 32 may be secured to the other end of the lead wire so that the strip 32 provides a support for the assembly and holds the lead wires 16 through 26 in the desired parallel orientation. The terminal 30 as shown in the drawings is used for making connection with a circuit board but may obviously be of any suitable type.

While the lead wires 16 through 26 as illustrated are of similar gauge it is contemplated that some applications of the invention may require individual lead wires to be of different gauges. Also it is contemplated that the insulation 34 of each lead wire may be color coded or may be distinctively marked to enable ready visual identification of individual lead wires.

FIGURE 3 illustrates a reel 36 useful in storing the lead wire assembly. The width of the reel is slightly greater than the length of the longest lead wire, in this case wire 16, so that the assembly may be wound around the reel core without bending the lead wires. A paper or other suitable separator 38 prevents snagging of adjacent layers of lead wires.

The reel 36 may be positioned adjacent an applicating machine so that the assembly is unwound from the reel and led directly to the machine. One group of lead wires is indexed into the machine at a time. The applicator then grips each of the ordered lead wires in the group and severs them from the carrier strip 32 by breaking the connecting portions 40 located between strip 32 and terminals 30. Each of the freed lead wires is then automatically secured to a circuit element to complete the cycle of operation.

What I claim as my invention is:

1. A continuous lead wire assembly of indeterminate length comprising a plurality of parallel insulated lead wires arranged in side by side relation along the length of the assembly and extending generally perpendicular thereto, said wires defining a number of like wire groups positioned serially along the length of the assembly, each of said like groups being made up of a number of lead wires having different lengths and being arranged in a predetermined sequence according to length, and wire holding means extending along the length of the assembly, each of said wires being removably secured to said means so that said means forms a carrier for the assembly.

2. An assembly as in claim 1 wherein contact terminals are secured to one end of each of said lead wires and wherein said means comprises a carrier strip, each of said contact terminals being secured to said strip.

3. An assembly as in claim 1 wherein contact terminals are secured to both ends of said lead wires with one type of contact terminal being secured to the ends of said lead wires located on one side of the assembly and another type of contact terminal being secured to the opposite ends of said lead wires.

4. An assembly as in claim 3 wherein the contact terminals on said one side of the assembly are arranged in a line and wherein said means comprises a carrier strip removably secured to each of said last named contact terminals.

5. An assembly as in claim 1 wherein the insulation coverings of like lead wires of each of said groups are provided with like identifying characteristics.

6. An assembly as in claim 5 wherein said identifying characteristics comprise color coding means.

References Cited

UNITED STATES PATENTS

| | | | |
|---|---|---|---|
| 2,871,551 | 2/1959 | Harris | 29—193.5 |
| 2,995,617 | 8/1961 | Maximoff et al. | 29—193.5 X |

ERNEST L. WEISE, *Primary Examiner.*

L. D. RUTLEDGE, *Assistant Examiner.*